Figure 1:
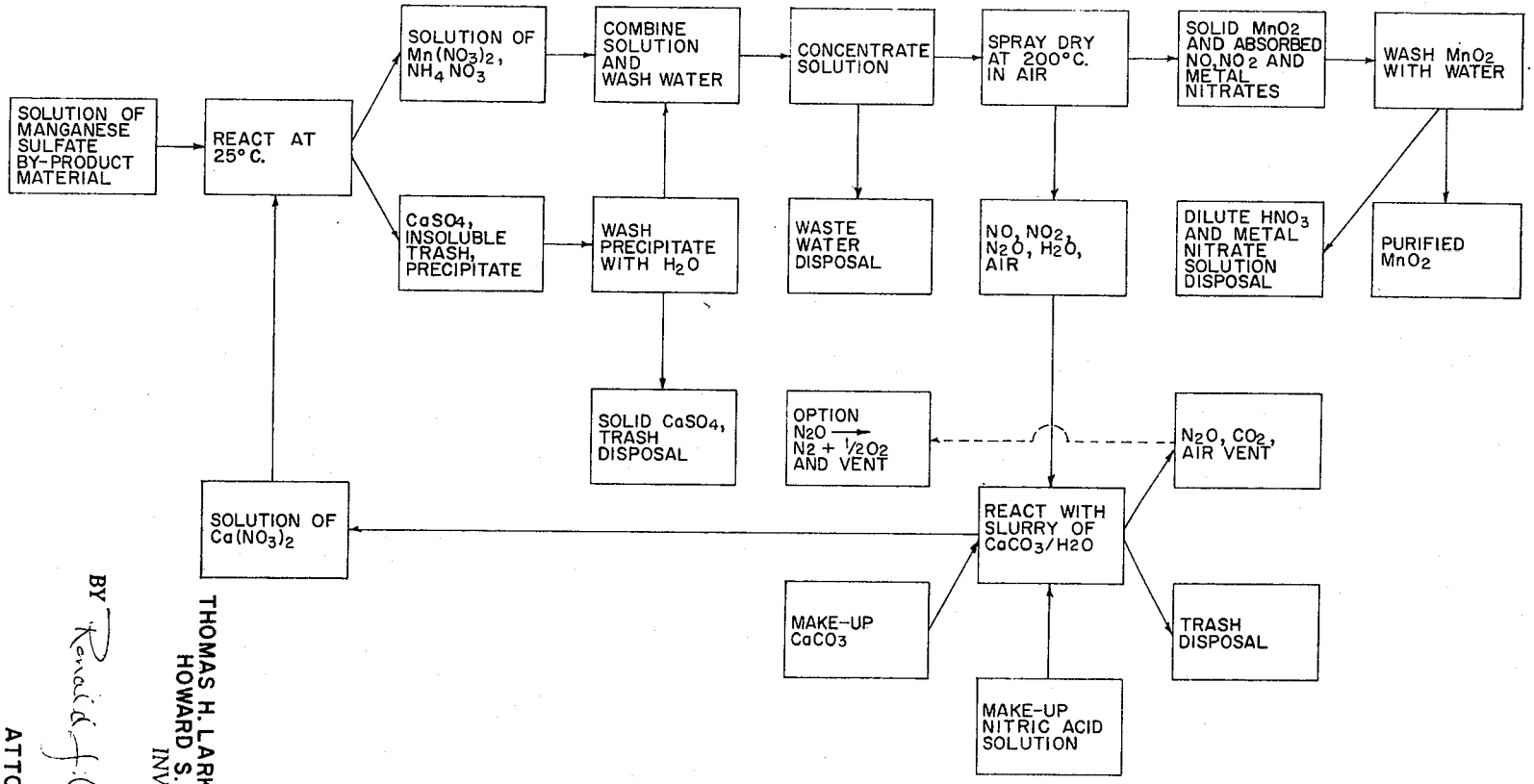
Figure 2:
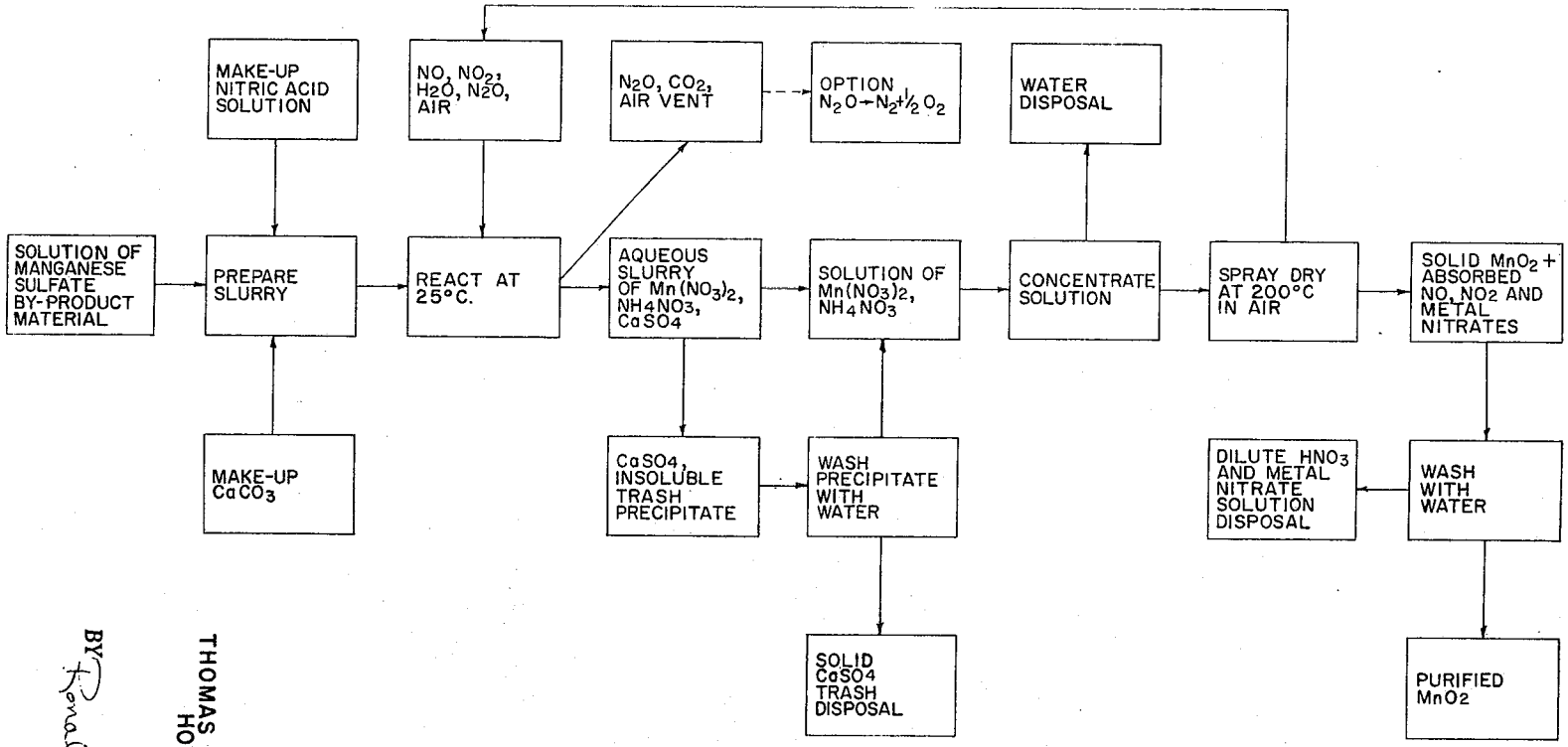

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MARCH 31, 1970

872 O.G. 1411

T872,010

PROCESS FOR PRODUCING MANGANESE DIOXIDE FROM CRUDE MANGANESE SULFATE

Thomas H. Larkins, Jr., 300 Stuffle St. 37660, and Howard S. Young, 1909 E. Sevier Ave. 37664, both of Kingsport, Tenn.

Filed Dec. 5, 1968, Ser. No. 781,324
**Int. Cl. C01g *45/02;* C01f *11/36***
U.S. Cl. 23—145
2 Sheets Drawing. 10 Pages Specification

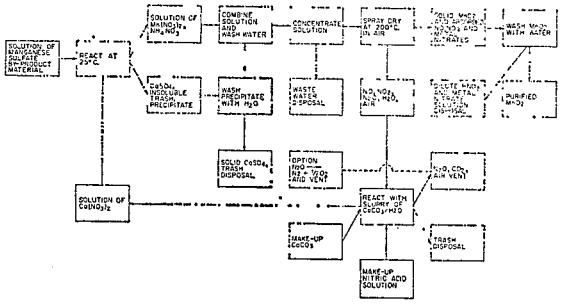

Manganese dioxide may be recovered from a manganese sulfate by-product material obtained from a process involving the oxidation of aniline sulfate in sulfuric acid to p-benzoquinone employing manganese dioxide. The recovery process generally involves feeding a crude manganese sulfate by-product material and calcium nitrate to a reactor and converting the manganese sulfate to manganese nitrate. Thereafter, the manganese nitrate is thermally decomposed to manganese dioxide and various oxides of nitrogen. The oxides of nitrogen are used to produce calcium nitrate for feeding to the reactor. An alterative method is to recycle the oxides of nitrogen to the reactor and feed calcium carbonate or hydroxide with the crude manganese sulfate to the reactor to form the calcium nitrate in situ in the reactor.

March 31, 1970 T. H. LARKINS, JR., ET AL T872,010

PROCESS FOR PRODUCING MANGANESE DIOXIDE FROM CRUDE MANGANESE SULFATE

Filed Dec. 5, 1968 2 Sheets-Sheet 1

THOMAS H. LARKINS JR.
HOWARD S. YOUNG
*INVENTORS*

BY Ronald J. Carlson

ATTORNEY

PROCESS FOR PRODUCING MANGANESE DIOXIDE
FROM CRUDE MANGANESE SULFATE

Filed Dec. 5, 1968 2 Sheets-Sheet 2

THOMAS H. LARKINS JR.
HOWARD S. YOUNG
*INVENTORS*

BY Ronald J. Carlson
ATTORNEY